United States Patent [19]
Amada

[11] Patent Number: 5,751,506
[45] Date of Patent: May 12, 1998

[54] DIGITAL INFORMATION REPRODUCING APPARATUS USING PARTIAL RESPONSE DETECTION METHOD INCLUDING QUADRUPLE PROCESSING

[75] Inventor: Nobutaka Amada, Yokohama, Japan

[73] Assignee: Hitachi, Ltd., Tokyo, Japan

[21] Appl. No.: 628,812

[22] Filed: Apr. 5, 1996

Related U.S. Application Data

[63] Continuation of Ser. No. 427,624, Apr. 21, 1995, abandoned, which is a continuation of Ser. No. 164,436, Dec. 9, 1993, abandoned.

[30] Foreign Application Priority Data

Dec. 10, 1992 [JP] Japan ................................. 4-330541

[51] Int. Cl.⁶ ............................................. G11B 5/09
[52] U.S. Cl. ........................................ 360/51; 375/290
[58] Field of Search ........................... 360/51, 77.01, 360/33.1, 46, 41, 66; 375/12, 17, 18, 119, 97, 82; 348/536, 537; 307/269; 364/602; 329/307

[56] References Cited

U.S. PATENT DOCUMENTS

| | | | |
|---|---|---|---|
| 4,180,779 | 12/1979 | Hook et al. | 329/307 |
| 4,376,958 | 3/1983 | Pettigrew | 360/41 |
| 4,885,756 | 12/1989 | Fontanes et al. | 375/82 |
| 4,970,609 | 11/1990 | Cunningham et al. | 360/46 X |
| 4,977,580 | 12/1990 | McNicol | 375/97 |
| 5,060,088 | 10/1991 | Dolivo et al. | 360/46 |
| 5,093,843 | 3/1992 | Hirosaki et al. | 375/18 |
| 5,166,955 | 11/1992 | Ohta | 375/18 X |
| 5,233,482 | 8/1993 | Galbraith et al. | 360/46 |
| 5,258,933 | 11/1993 | Johnson et al. | 364/602 |
| 5,260,703 | 11/1993 | Nguyen et al. | 360/46 X |
| 5,260,841 | 11/1993 | Suzuki et al. | 360/51 |
| 5,414,567 | 5/1995 | Amada et al. | 360/66 X |

FOREIGN PATENT DOCUMENTS

| | | |
|---|---|---|
| 134578 | 7/1979 | German Dem. Rep. |
| A-3-166839 | 11/1989 | Japan |
| A-3-172046 | 11/1989 | Japan |

OTHER PUBLICATIONS

A.D. Fagan & R.E. O'Connor, Measurements on the timing recovery performance of partial response class 4 signalling, IEE Proceedings, vol. 136, Aug. 1989, pp. 254–258.

Trans. The Institute of Television Engineers of Japan, vol. 42, No. 4, Apr. 1988.

*Primary Examiner*—Aristotelis M. Psitos
*Assistant Examiner*—Patrick Wamsley
*Attorney, Agent, or Firm*—Evenson, McKeown, Edwards & Lenahan, P.L.L.C.

[57] ABSTRACT

In a digital information reproducing apparatus in which a clock signal can be recovered stably when reproduced digital information signals are detected by utilizing a partial response (PR) class 4 detection method, a digital information signal reproduced from a magnetic tape is equalized into a PR (1, −1) signal by means of an equalizer circuit, then equalized eventually into the PR class 4 signal by means of a (1+D) operation circuit and supplied to a ternary discriminator circuit to provide original digital information. A signal equalized into the PR (1, −1) signal and delivered out of the equalizer circuit is supplied to a clock component extractor circuit comprised of, for example, two squaring circuits, and a signal spectrum is generated in which a bright-line spectrum of high level develops at a bit frequency component of the reproduced digital information signal. The signal spectrum is supplied to a PLL circuit and a clock signal phase-locked to the bit frequency component can be obtained.

2 Claims, 9 Drawing Sheets

DIGITAL INFORMATION REPRODUCING APPARATUS USING PARTIAL RESPONSE DETECTION METHOD INCLUDING QUADRUPLE PROCESSING

This application is a continuation of application Ser. No. 08/427,624, filed on Apr. 21, 1995 now abandoned, which is a continuation of application Ser. No. 08/164,436, filed on Dec. 9, 1993, now abandoned.

BACKGROUND OF THE INVENTION

1. Field of the Invention

The present invention relates to an apparatus for reproducing a digital information signal from a recording medium and more particularly to a digital information reproducing apparatus for detecting a digital information signal by utilizing the partial response class 4 detection method.

2. Description of the Related Art

Recently, the partial response (hereinafter abbreviated as PR) detection method has been highlighted as a signal detection method of a reproducing system in a high-density digital magnetic recording system. Of PR detection methods, a PR class 4 detection method has been particularly considered which has a transmission frequency characteristic approximating that of the magnetic recording/reproducing system and has an excellent low-band cut-off preventive characteristic. Even when a digital information signal is detected by utilizing the PR class 4 detection method, a clock signal for obtaining digital information through discrimination is necessary and to this end, a variety of techniques for recovering a clock signal from a reproduced digital information signal have been proposed.

One of the techniques is described in JP-A-3-166839, according to which in consideration of the fact that a signal obtained after equalization based on the PR class 4 detection method is a ternary signal and hence recovery of a clock signal from the equalized signal is difficult to achieve, a reproduced signal is first subjected to equalization free from intersymbol interference, i.e., equalization using an integral detection method in advance of equalization based on the PR class 4 detection method so as to be converted into a binary signal and then a clock signal is recovered from the binary signal.

Another example is described in JP-A-3-172046. In this example, a reproduced digital information signal is processed for equalization and supplied to a decoder where an equalized signal is processed for decoding of PR (1, 0, −1), and a decoded signal is supplied to a discriminator circuit. In the decoder, a processing of PR (1, −1) is first carried out and thereafter a processing of PR (1, 0, −1) is effected, whereby a clock signal is recovered from a signal subject to the PR (1, −1) processing. Thus, the signal subject to the PR (1, −1) processing has a power spectrum having a peak corresponding to a frequency component which is ½ times the clock signal frequency, and by squaring or rectifying the PR (1, −1) processed signal, the clock signal can be extracted.

The signal detection method of a reproducing system in a digital magnetic recording system, such as the integral detection method or the partial response detection method, is described in, for example, "Trans. The Institute of Television Engineers of Japan", Vol. 42, No. 4, April, 1988.

The conventional technique described in JP-A-3-166839, however, faces a problem in that recovery of a clock signal is difficult to achieve when a method is employed wherein, for example, a scrambled NRZ code having a signal spectrum extending up to a low-band frequency is used as a recording code.

More particularly, the integral detection method elevates the low-band frequency through integral operation and hence, when a clock signal is recovered by using this method, the S/N is deteriorated. Further, in a system using a rotary head, low-band cut-off due to a rotary transformer and the like causes a low-band signal spectrum to drop out and intersymbol interference results. Accordingly, when the aforementioned method is used in which the signal spectrum extends up to the low-band frequency, a binary signal suffering intersymbol interference is obtained or a desired binary signal is obtained at the cost of considerable degradation in S/N even if the reproduced digital information signal is equalized by means of the equalizer, making it difficult to recover a clock signal.

In the technique described in JP-A-3-172046, a clock signal component on a power spectrum can be emphasized and can be made to be separable to some extent by squaring or rectifying a PR (1, −1) processed digital information signal. However the degree of the emphasis is low and still recovery of a clock signal is not easy to conduct. The literature discloses a clock extractor circuit comprised of a rectifier circuit and a tank circuit. Because of the operation mentioned just above, large energy of a signal component near the clock signal frequency mixes with an output signal of the tank circuit to decrease the S/N.

SUMMARY OF THE INVENTION

The present invention intends to solve the above problems and it is an object of the present invention to provide a digital information reproducing apparatus which is suitable for the PR class 4 detection method and which can recover a clock signal stably even when a recording code, such as a scrambled NRZ code having a signal spectrum extending up to a low-band frequency, is used.

To accomplish the above object, according to the present invention, a reproduced digital information signal is equalized such that the intersymbol interference becomes (1, −1) or is equalized into a PR (1, −1) signal as will hereinafter be referred to. Thereafter, a PR (1, −1) signal is eventually equalized to a PR class 4 detection method in which the intersymbol interference becomes (1, 0, −1), and a resulting ternary information signal is discriminated to provide digital information. To this end, the PR (1, −1) signal is supplied to a clock component extractor circuit having a raised to the fourth power circuit constructed of two squaring circuits, a clock component extractor circuit having two squaring circuits and a level shift circuit interposed therebetween or a clock component extractor circuit having a full-wave rectifier circuit, a squaring circuit and a level shift circuit interposed therebetween, to permit a clock signal to be recovered from the reproduced digital information signal.

When the signal equalized into the PR (1, −1) is processed by the clock component extractor circuit, a signal delivered out of the extractor circuit has a bright-line spectrum of high level at a bit frequency component of a reproduced digital information signal to permit steady extraction of a clock signal. Accordingly, the elevation of the low-band frequency as required in the conventional technique based on the integral detection method becomes unnecessary, an excellent low-band cut-off preventive characteristic can be obtained, an equalized signal can be freed from unwanted intersymbol interference due to low-band cut-off and deterioration in S/N can be prevented, thereby ensuring that a stable clock signal phase-locked to a bit frequency component of the recovered digital information signal can be reproduced.

DESCRIPTION OF THE PREFERRED EMBODIMENTS

The present invention will now be described by way of example with reference to the accompanying drawings.

Figure 1:
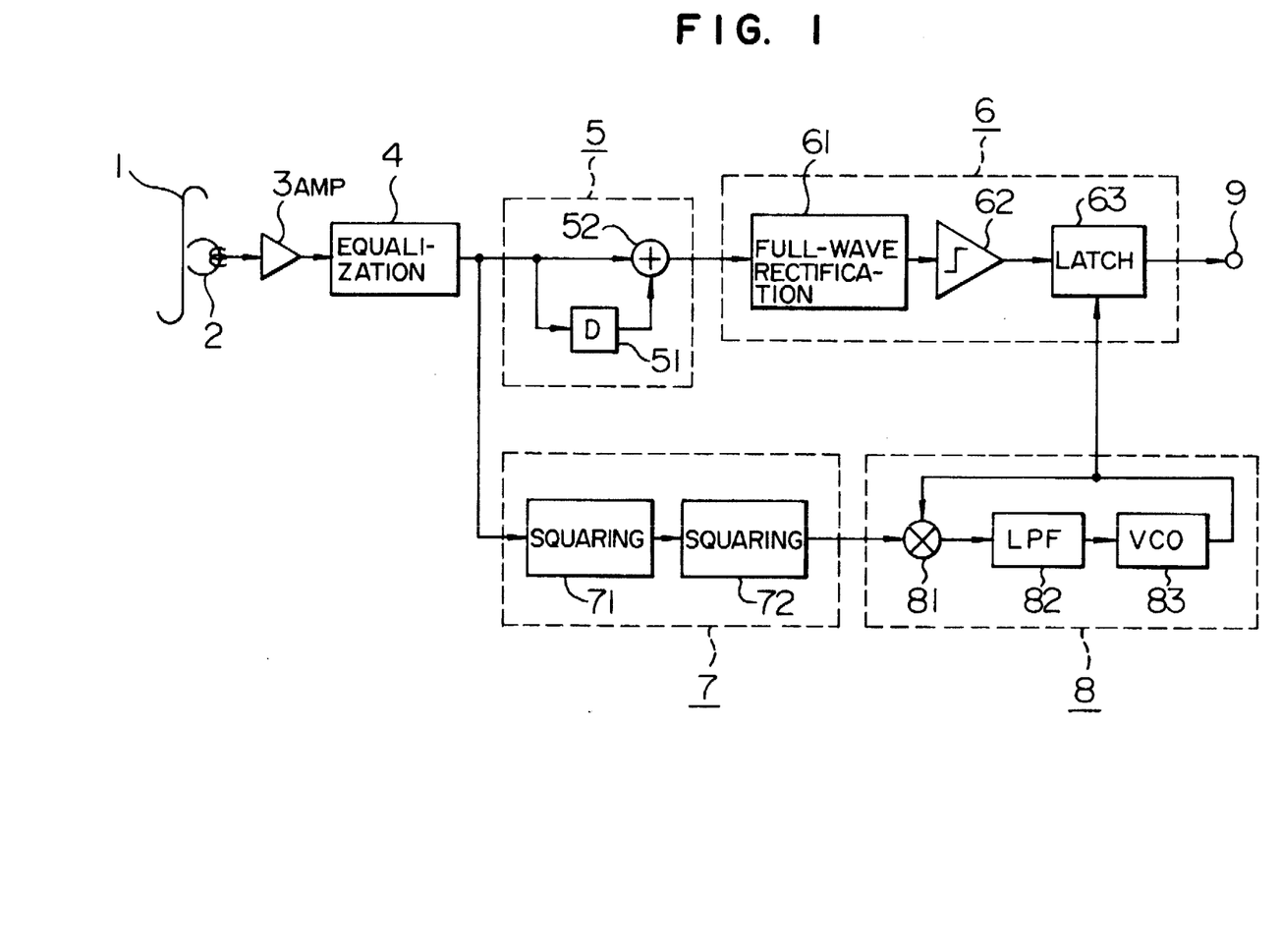
FIG. 1 is a block diagram showing a configuration of an embodiment of a digital information reproducing apparatus according to the present invention.

FIG. 1 is a block diagram showing an embodiment of a digital information reproducing apparatus according to the present invention. Illustrated therein are a magnetic tape 1, a magnetic head 2, an amplifier 3, an equalizer circuit 4, a (1+D) operation circuit 5 including a delay circuit 51 and an adder 52, a ternary discriminator circuit 6 including a full-wave rectifier circuit 61, a limiter 62 and a latch circuit 63, a clock component extractor circuit 7 including squaring circuits 71 and 72, a PLL (phase locked loop) circuit 8 including a multiplier 81, a low-pass filter 82 and a VCO (voltage controlled oscillator) 83, and an output terminal 9.

Figure 2:
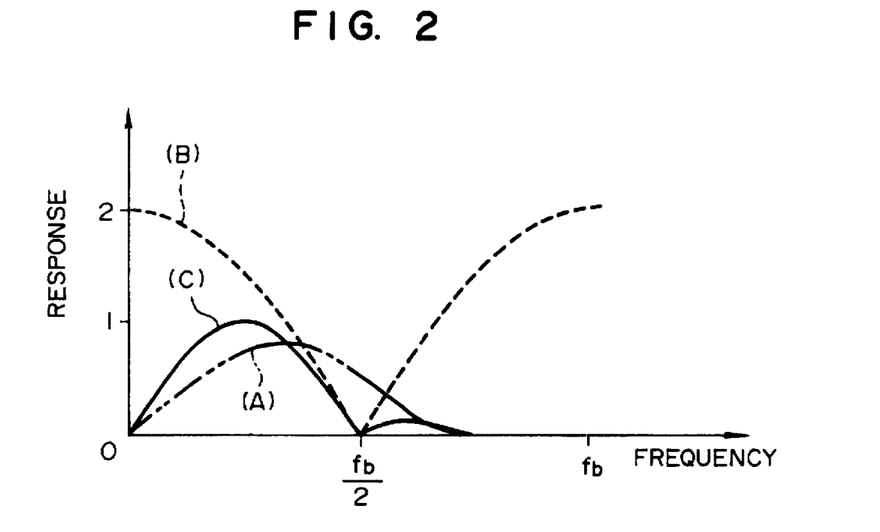
FIG. 2 is a graph showing a frequency characteristic of the partial response class 4 in the embodiment shown in FIG. 1.
Figure 3A:
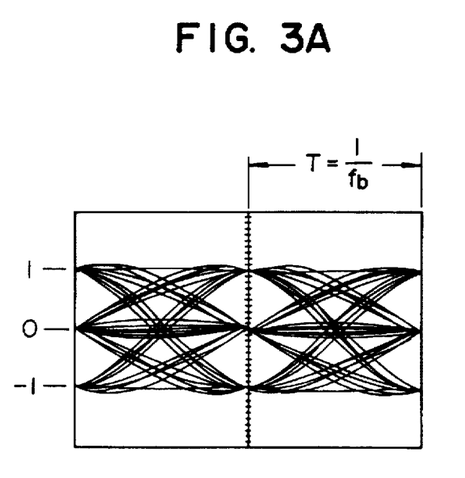
FIGS. 3A and 3B are diagrams showing eye patterns obtained after equalization in the embodiment shown in FIG. 1.

In the Figure, a digital information signal read out of the magnetic tape 1 by means of the magnetic head 2 is amplified by the amplifier 3 and then supplied to the equalizer circuit 4 where an amplified signal is equalized into a PR (1, −1) signal in which the intersymbol interference becomes (1, −1). In FIG. 2, a characteristic (A) indicated by a double chained curve represents an example of an overall frequency characteristic of a recording/reproducing system ending in the equalizer circuit 4, and FIG. 3A shows an eye pattern obtained after equalization based on the characteristic (A). In these Figures, fb and T represent a bit frequency and a bit period of the recorded digital information signal, respectively.

Figure 3B:
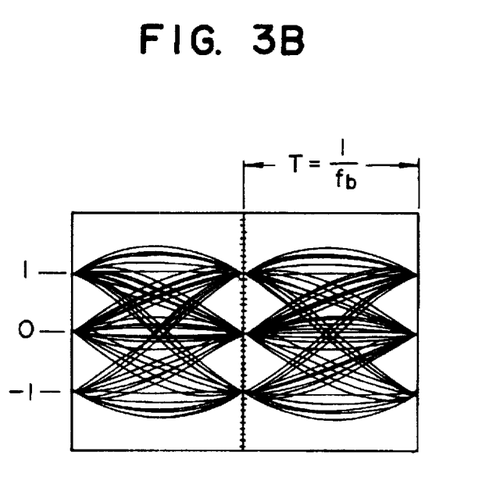

An output signal of the equalizer circuit 4 is supplied to the (1+D) operation circuit 5. In the (1+D) operation circuit 5, the signal equalized into the PR (1, −1) signal is, on the one hand, supplied to the adder 52 and, on the other hand, one bit delayed at the delay unit 51. The undelayed signal and the delayed signal are added together by the adder 52. Through the above operation of the (1+D) operation circuit 5, the digital information signal is eventually equalized into a PR class 4 signal. In FIG. 2, a characteristic (B) indicated by a dotted curve represents a frequency characteristic of the (1+D) operation circuit 5 and a characteristic (C) indicated by a solid curve represents an example of an overall frequency characteristic obtained after equalization into the final PR class 4 detection method. Needless to say, the characteristic (C) results from multiplying the characteristic (A) by the characteristic (B). FIG. 3B shows an eye pattern after the equalization based on the characteristic (C), indicating that the output signal of the (1+D) operation circuit 5 is a ternary signal.

The ternary signal is supplied to the ternary discriminator circuit 6. This ternary discriminator circuit 6 is comprised of, for example, the full-wave rectifier circuit 61, limiter 62 and latch circuit 63 and it discriminates codes of the supplied ternary signal at timings defined by a clock signal from the PLL circuit 8 to reproduce an original binary digital information signal. The thus reproduced original digital information signal is delivered through the output terminal 9.

On the other hand, the signal equalized into the PR (1, −1) signal and delivered out of the equalizer circuit 4 is supplied to the clock component extractor circuit 7 and a clock component is extracted. This clock component is supplied to the PLL circuit 8 including the multiplier 81, low-pass filter 82 and VCO 83, and a clock signal which is phase-locked to the clock component is obtained. This clock signal is supplied, as a latch pulse, to the latch circuit 63 of the ternary discriminator circuit 6.

Figure 4A:
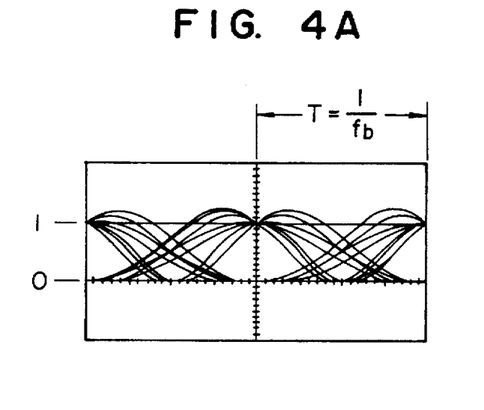
FIG. 4A is a diagram showing an eye pattern of an output signal of a preceding squaring circuit when a clock component extractor circuit in FIG. 1 is comprised of two squaring circuits.
Figure 4B:
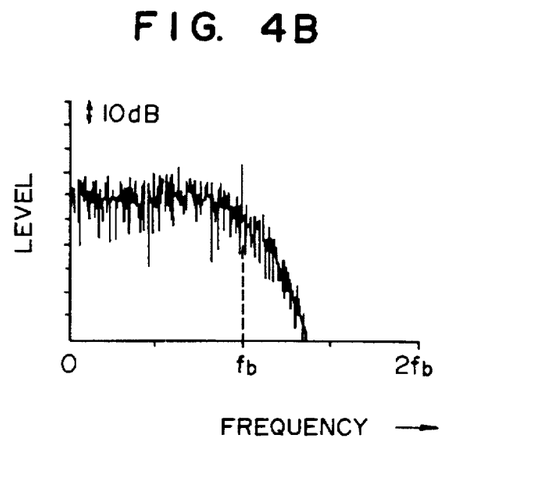
FIG. 4B is a graph showing a signal spectrum of the output signal of the preceding squaring circuit.
Figure 5A:
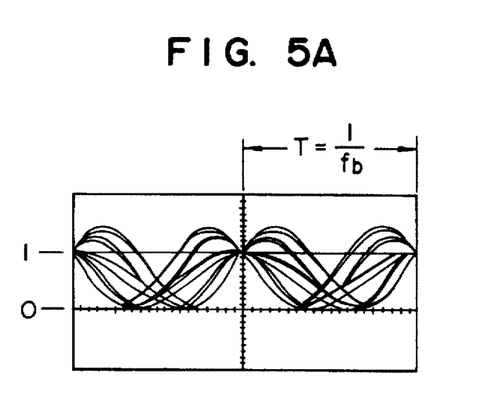
FIG. 5A is a diagram showing an eye pattern of an output signal of a succeeding squaring circuit of the clock component extractor circuit shown in FIG. 1.
Figure 5B:
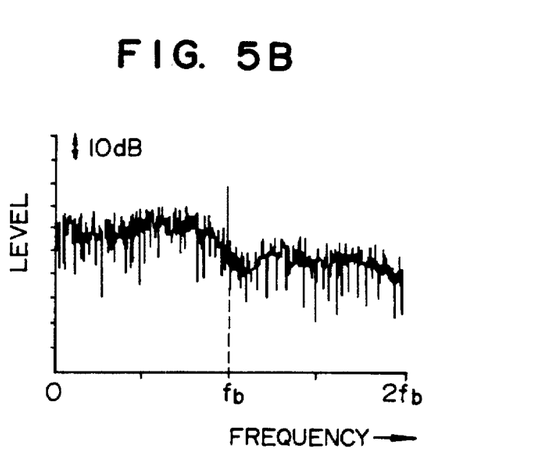
FIG. 5B is a graph showing a signal spectrum of the output signal of the succeeding squaring circuit.

As a concrete example, the clock component extractor circuit 7 includes the two squaring circuits 71 and 72 and the signal equalized into the PR (1, −1) signal is raised to the fourth power so that a component of bit frequency fb of the digital information signal reproduced from the magnetic tape 1 may be extracted. FIG. 4A shows an eye pattern of an output signal of the first-stage squaring circuit 71, FIG. 4B shows a frequency spectrum of that output signal, FIG. 5A shows an eye pattern of an output signal of the second-stage squaring circuit 72, and FIG. 5B shows a frequency spectrum of that output signal. As is clear from FIGS. 4B and 5B, the component of bit frequency fb of the digital information signal develops as a bright-line spectrum in each of the output signals of the squaring circuits 71 and 72, and the level of the bright-line spectrum is higher in FIG. 5B than in FIG. 4B. The PLL circuit 8 has a loop gain and a central oscillation frequency of VCO 83 which are set such that the PLL circuit is phase-locked to the bright-line spectrum representative of the component of bit frequency fb of the digital information signal and under the application of the signal spectrum as shown in FIG. 5B obtained through the fourth power processing, the PLL circuit can be phase-locked stably to the component of bit frequency fb of the digital information signal, thereby recovering a stable clock signal.

Since the clock signal is reproduced not from the signal obtained after the equalization based on the PR class 4 detection method but from the signal obtained after the equalization based on the PR (1, −1) method, it is not necessary that the low-band frequency be elevated as described previously. Accordingly, deterioration in S/N can be prevented and an excellent low-band cut-off preventive characteristic can be obtained, thus preventing unwanted intersymbol interference due to low-band cut-off.

Figure 6:
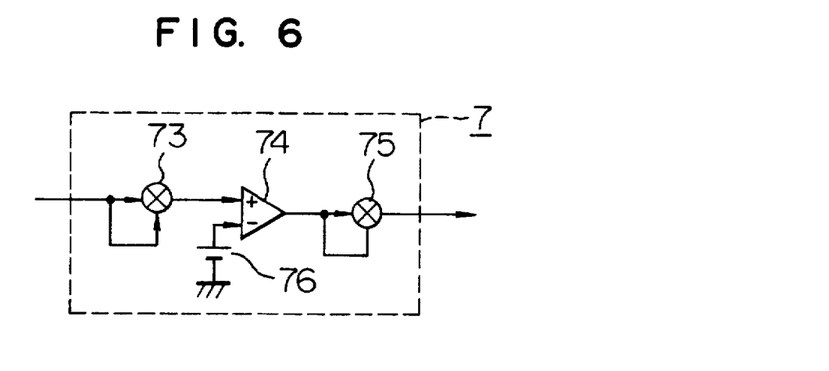
FIG. 6 is a circuit diagram showing a construction of another embodiment of the clock component extractor circuit in FIG. 1.

FIG. 6 is a diagram showing another concrete example of construction of the clock component extractor circuit 7 shown in FIG. 1. Illustrated therein are a multiplier 73, a differential amplifier 74, a multiplier 75 and a constant voltage source 76.

In the Figure, a signal equalized into the PR (1, −1) signal as above is applied to two inputs of the multiplier 73 so as to be squared. An output signal of the multiplier 73 is subjected to level shift in one direction by means of the differential amplifier 74 and constant voltage source 76 and an output signal delivered out of the differential amplifier 74 is supplied to two inputs of the multiplier 75 so as to be squared. Accordingly, in this concrete example, a level shift circuit comprised of the differential amplifier 74 and constant voltage source 76 is inserted between the two squaring circuits.

Figure 7A:
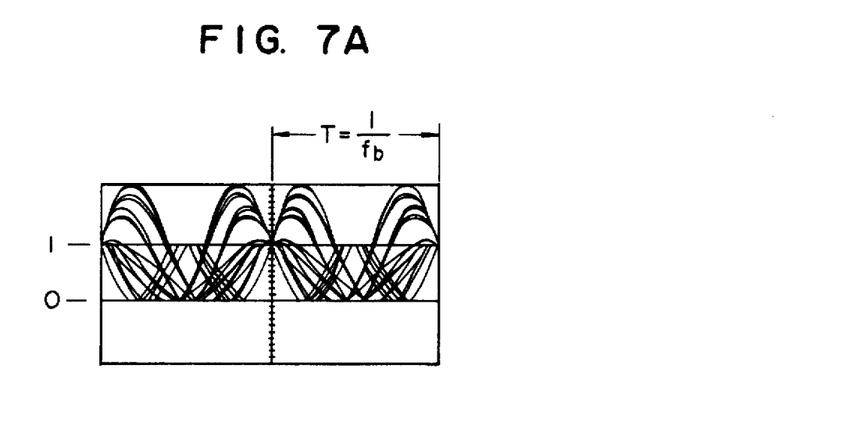
FIG. 7A is a diagram showing an eye pattern of an output signal of the clock component extractor circuit shown in FIG. 6.
Figure 7B:
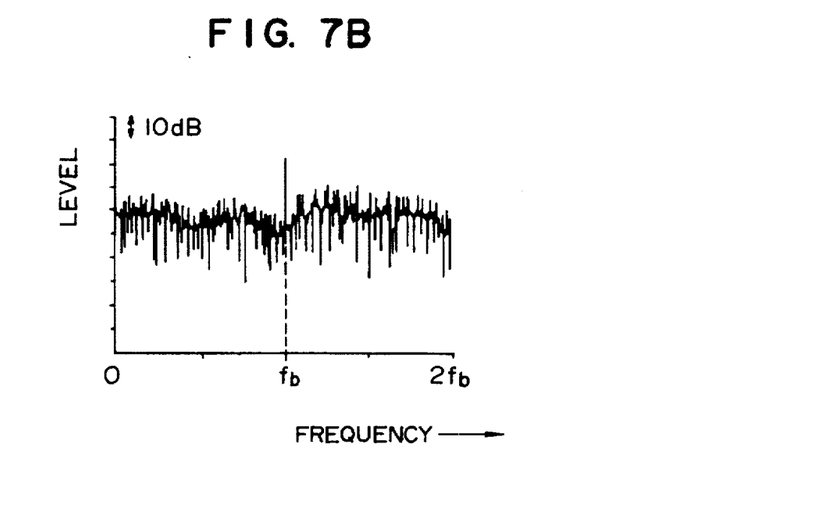
FIG. 7B is a graph showing a signal spectrum of the output signal of the FIG. 6 extractor circuit.

FIG. 7A shows an eye pattern of an output signal of the clock component extractor circuit 7 constructed as above, and FIG. 7B shows a signal spectrum of the output signal.

As is clear from FIG. 7B, the component of bit frequency fb of the digital information signal develops as a bright-line spectrum also in the signal spectrum of the output signal of the clock component extractor circuit 7 and thanks to the interposition of the level shift circuit between the two squaring circuits, the level of the component of bit frequency fb extracted in the form of a bright-line spectrum can be more increased in this example than in the extractor circuit constructed of the two squaring circuits alone. Accordingly, the detection sensitivity of the PLL circuit 8 can be increased to enhance the stability of a recovered clock.

Figure 8:
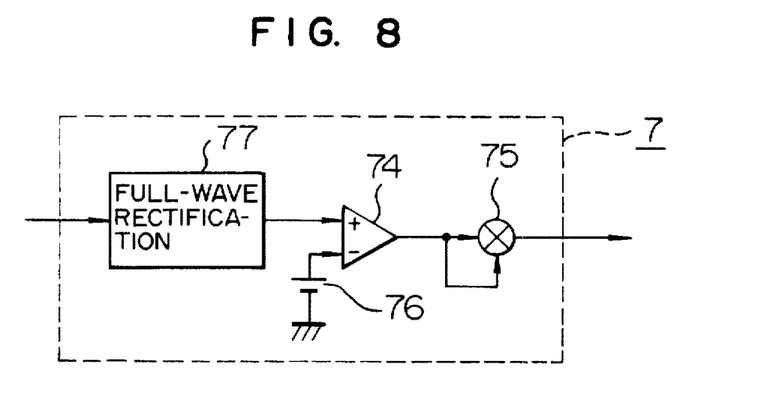
FIG. 8 is a circuit diagram showing a construction of still another embodiment of the clock component extractor circuit in FIG. 1.

FIG. 8 is a diagram showing still another concrete example of construction of the clock component extractor circuit 7 shown in FIG. 1. Illustrated therein are a full-wave rectifier circuit 77 and components corresponding to those in FIG. 6 which are designated by like reference numerals.

In the concrete example shown in FIG. 8, the full-wave rectifier circuit 77 is provided in place of the preceding multiplier 73 in the concrete example shown in FIG. 6, and a signal equalized into the PR (1, −1) mode is subjected to full-wave rectification by means of the full-wave rectifier circuit 77, then supplied to the differential amplifier 74 and thereafter processed in a similar manner to the concrete example shown in FIG. 6.

Figure 9A:
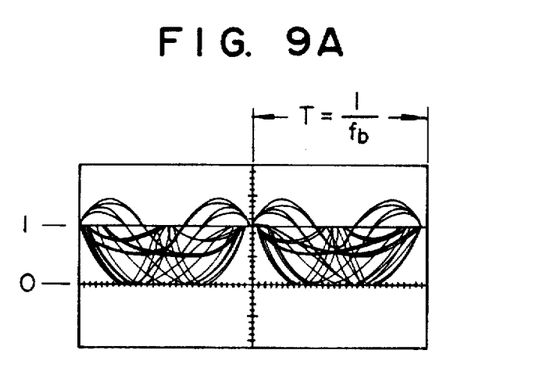
FIG. 9A is a diagram showing an eye pattern of an output signal of the clock component extractor circuit shown in FIG. 8.
Figure 9B:
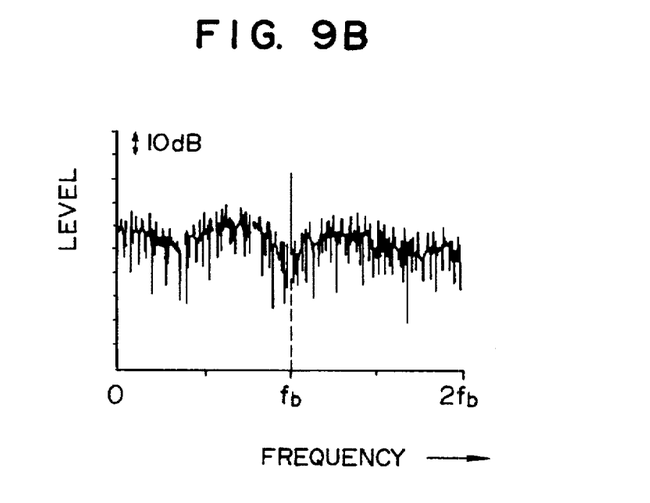
FIG. 9B is a graph showing a signal spectrum of the output signal of the FIG. 8 extractor circuit.

FIG. 9A shows an eye pattern in this concrete example and FIG. 9B shows a signal spectrum therein. The level of the component of bit frequency fb in the digital information signal is more increased of this concrete example than in the concrete example shown in FIG. 6, thus enhancing the stability of a recovered clock.

Other embodiments of the digital information reproducing apparatus according to the present invention using the clock component extractor circuit described hereinbefore will now be described.

Figure 10:
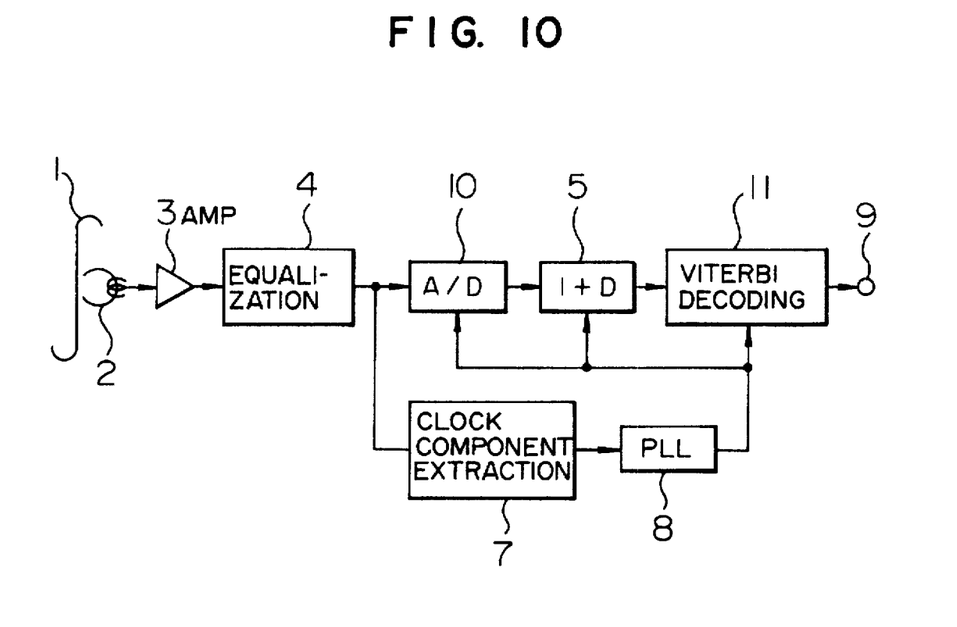
FIG. 10 is a block diagram showing a configuration of a second embodiment of the digital information reproducing apparatus according to the present invention.

FIG. 10 is a block diagram showing a configuration of a second embodiment comprising an A/D (analog/digital) converter 10, a Viterbi decoder 11 and components corresponding to those of FIG. 1 which are designated by like reference numerals and are not described herein.

This embodiment features that the A/D converter 10 and Viterbi decoder circuit 11 are used in place of the ternary discriminator circuit 6, as shown in FIG. 10, in the embodiment of FIG. 1 and the (1+D) operation circuit 5 is interposed between the A/D converter 10 and the Viterbi decoder circuit 11.

A ternary signal equalized into the PR (1, −1) signal and delivered out of the equalizer circuit 4 is converted into a digital signal of several bits by means of the A/D converter 10 and is digitally subjected to the previously-described operation processing by means of the (1+D) operation circuit 5 so as to be equalized eventually into the PR class 4 detection method. By utilizing the correlation between sequential data pieces of the thus equalized signal, the Viterbi decoder circuit 11 detects transition between the data pieces and on the basis of a result of the detection, it performs maximum likelihood decoding of the data pieces. Through this, the error rate of data after decoding can be decreased.

Figure 11:
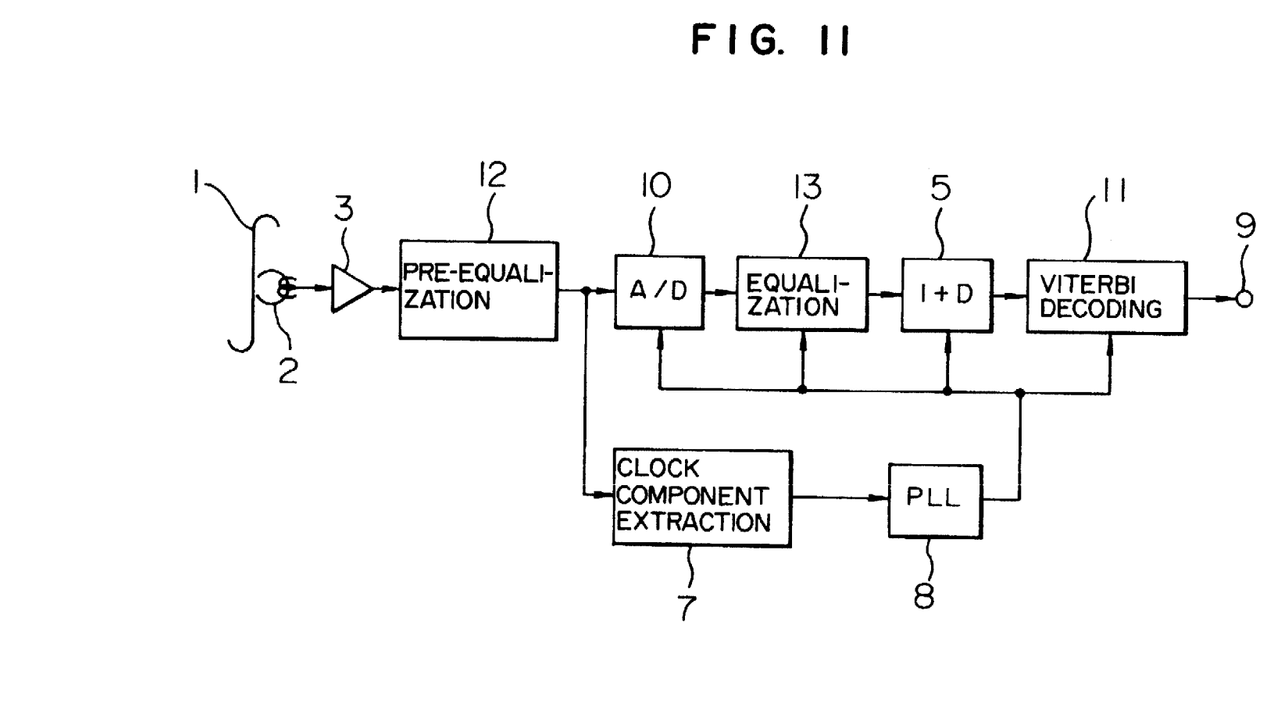
FIG. 11 is a block diagram showing a configuration of a third embodiment of the digital information reproducing apparatus according to the present invention.

FIG. 11 is a block diagram showing a configuration of a third embodiment of the digital information reproducing apparatus according to the present invention comprising a pre-equalizer circuit 12, an equalizer circuit 13 and components corresponding to those of FIG. 10 which are designated by like reference numerals.

In comparison with the embodiment shown in FIG. 10, the present embodiment is constructed such that the equalizer circuit 4 is divided into the pre-equalizer circuit 12 and digital equalizer circuit 13, the pre-equalizer circuit 12 precedes the A/D converter 10, the equalizer circuit 13 is interposed between the A/D converter 10 and (1+D) operation circuit 5, and an output signal of the pre-equalizer circuit 12 is supplied to the clock component extractor circuit 7.

The pre-equalizer circuit 12 is constructed of, for example, a simple transversal filter having about three taps and performs not complete equalization based on the PR (1, −1) method but simple equalization which can permit clock reproduction at the least. The complete equalization based on the PR (1, −1) method is perfected by the equalizer circuit 13. The equalizer circuit 13 is constructed of a digital transversal filter and so, like the (1+D) operation circuit 5 in the embodiment shown in FIG. 10, the one-bit delay unit can be replaced with a latch circuit. Accordingly, as compared to the case where the whole of the equalizer circuit 4 is constructed of an analog circuit, the overall circuit construction can be simplified.

The equalizer circuit 13 and (1+D) operation circuit 5 can be unified to a single circuit to thereby further simplify the circuit construction.

When the equalizer circuit 13 or the unitary circuit of equalizer 13 and (1+D) operation circuit 5 is constructed of an adaptive automatic equalizer circuit, an optimum equalization characteristic can be obtained in compliance with a variation in characteristics of the magnetic tape 1 or magnetic head 2 to thereby decrease the error rate of data after decoding.

Incidentally, while the foregoing embodiments have been described by way of the digital magnetic recording system using the PR class 4 detection method, the present invention is in no way limited thereto and may be applied to any system which uses an extended detection method based on the PR class 4 detection method.

Figure 12:
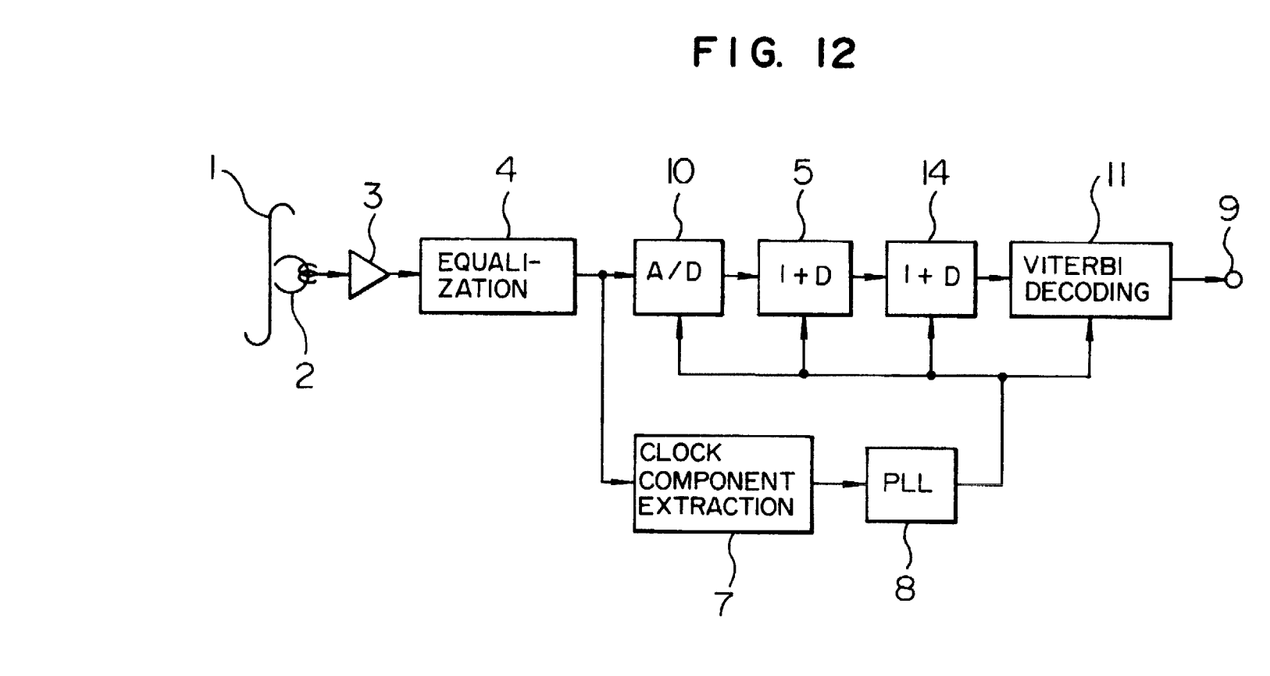
FIG. 12 is a block diagram showing a configuration of a fourth embodiment of the digital information reproducing apparatus according to the present invention.

FIG. 12 is a block diagram showing a configuration of a fourth embodiment of the digital information reproducing apparatus according to the present invention directed to the extended detection method and comprising a (1+D) operation circuit 14 and components corresponding to those of FIG. 10 which are designated by like reference numerals and are not described herein.

In this embodiment, the invention is applied to a system using a detection method called an extended PR class 4 detection method and as shown in FIG. 12, the (1+D) operation circuit 14 is interposed between the (1+D) operation circuit 5 and Viterbi decoder 11 of the embodiment shown in FIG. 10, whereby (1+D) operation is carried out digitally by means of the (1+D) operation circuits 5 and 14 and a digital information signal is equalized into the final extended PR class 4 detection method.

Figure 13:
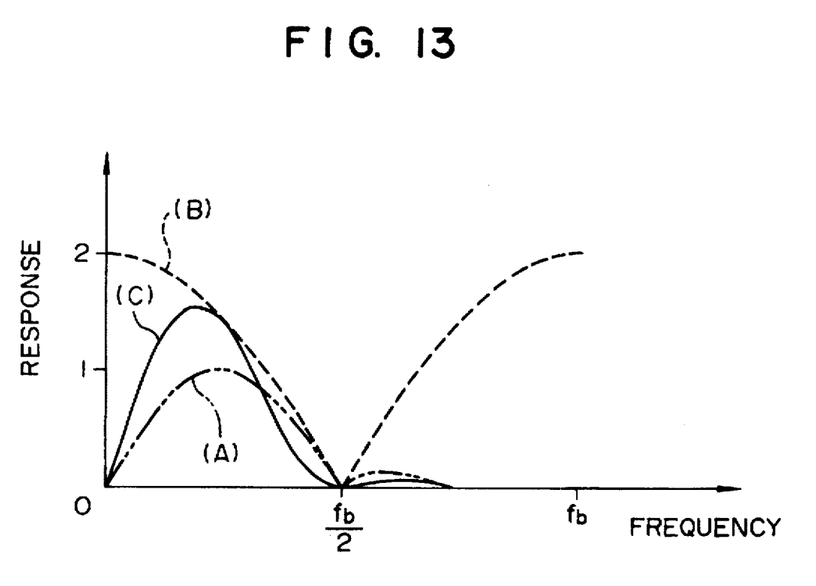
FIG. 13 is a graph showing a frequency characteristic of an extended partial response class 4 in the embodiment shown in FIG. 12.
Figure 14:
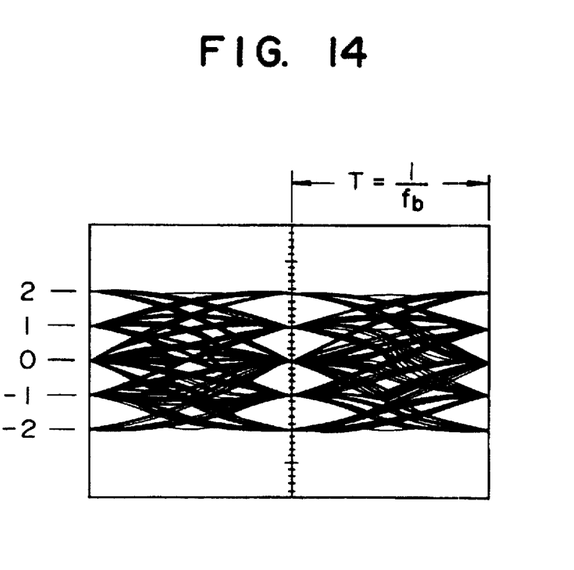
FIG. 14 is a diagram showing an eye pattern obtained after equalization in the embodiment shown in FIG. 12.

In FIG. 13, a characteristic (A), like the characteristic (C) shown in FIG. 2, represents an overall frequency characteristic obtained after equalization based on the PR class 4 method by means of the equalizer circuit 4 and (1+D) operation circuit 5, a characteristic (B) represents a frequency characteristic of the (1+D) operation circuit 14 and a characteristic (C) represents an overall frequency characteristic obtained after equalization based on the final extended PR class 4 method. FIG. 14 shows an eye pattern obtained after equalization into the final extended PR class 4.

Thus, in the extended PR class 4 detection method, the there is a quinary eye pattern (FIG. 14) of the finally equalized signal but the clock signal is recovered from a signal obtained after equalization based on the PR (1, −1) method by the equalizer circuit 4 and therefore a stable clock signal can be obtained as in the case of the PR class 4 detection method.

The present invention has been described by way of example but is not limited to the foregoing embodiments alone. For example, the present invention may be applied to a digital magnetic recording system using a magnetic tape as a recording medium as well as any system such as a digital magnetic recording system using a magnetic disc or an optical disc system which uses the PR class 4 detection method or its extended method.

As described above, according to the present invention, in detecting a digital information signal recorded on a recording medium by utilizing the partial response class 4 detection method or its extended method, a stable clock signal can be recovered even when a recording code such as a scrambled NRZ code having a signal spectrum extending up to a low-band frequency is used to thereby realize a high-density digital magnetic recording system.

What is claimed is:

1. A digital information reproducing apparatus for detecting digital information signals recorded on a recording medium by utilizing a partial response detection method, comprising:

a read means for reading a digital information signal from said recording medium;

an equalizer means for equalizing an output signal of said read means into a partial response PR (1, −1) signal, said output signal of said equalizer means being a ternary base band signal;

an operation means for performing a (1+D) operation by adding the output signal of said equalizer means and a signal obtained by one bit delaying said output signal of said equalizer means;

a discriminator means for discriminating an output signal of said operation means to provide an original digital information signal and decoding said original digital information signal; and a clock recovering means for recovering, from said output signal of said equalizer means, a clock signal necessary to provide said original digital information signal through said discrimination and to decode said original digital information signal and for supplying said clock signal to said discriminator means.

said clock recovering means including:

a clock component extractor means for extracting a bit frequency component of said digital information signal by raising said output signal of said equalizer means to the fourth power, wherein said clock component extractor means consists of two squaring circuits connected directly in cascade; and a phase-locked loop circuit for phase-locking its output signal to said bit frequency component of said digital information signal contained in an output signal of said clock component extractor means and for producing a phase-locked signal as said clock signal.

2. A digital information reproducing apparatus for detecting digital information signals recorded on a recording medium by utilizing a partial response detection method, comprising:

a read means for reading a digital information signal from said recording medium;

an equalizer means for equalizing an output signal of said read means into a partial response PR (1, −1) signal, said output signal of said equalizer means being a ternary base band signal;

an operation means for performing a (1+D) operation by adding the output signal of said equalizer means and a signal obtained by one bit delaying said output signal of said equalizer means;

a discriminator means for discriminating an output signal of said operation means to provide an original digital information signal and decoding said original digital information signal; and a clock recovering means for recovering, from said output signal of said equalizer means, a clock signal necessary to provide said original digital information signal through said discrimination and to decode said original digital information signal and for supplying said clock signal to said discriminator means.

said clock recovering means including:

a clock component extractor means for extracting a bit frequency component of said digital information signal, wherein said clock component extractor means consists of two squaring circuits connected directly in cascade; and a phase-locked loop circuit for phase-locking its output signal to said bit frequency component of said digital information signal contained in an output signal of said clock component extractor means and for producing a phase-locked signal as said clock signal.

* * * * *